3,040,023
MONOAZO-DYESTUFFS
Alfred Fasciati, Bottmingen, and Raymond Gunst, Binningen, Switzerland, assignors to Ciba Corporation, a corporation of Delaware
No Drawing. Filed June 11, 1959, Ser. No. 819,553
Claims priority, application Switzerland June 13, 1958
3 Claims. (Cl. 260—153)

This invention provides valuable new monoazo-dyestuffs of the formula (1)
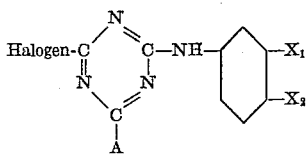

in which A represents the radical of an amino-benzene carboxylic acid bound through its amino group, and one of the symbols X represents, a sulfonic acid group and the other X, advantageously $X_1$, represents a grouping of the formula (2)
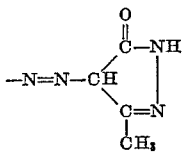

The dyestuffs of this invention can be made by using as starting material an appropriate dyestuff, obtainable by a method in itself known, which contains a dihalogen-triazine radical, more especially a 2:4-dichloro-1:3:5-triazine radical, and exchanging one of the two halogen atoms in such dihalogen-triazine dyestuff by reaction with an appropriate amino-benzene carboxylic acid. The dihalogen-triazine dyestuffs to be used for this purpose can be made by a method in itself known by reacting a monoazo-dyestuff of the formula (3)
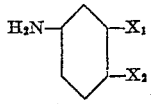

in which one of the two symbols X represents a sulfonic acid group and the other X, advantageously $X_1$ represents a grouping of the Formula 2, with a 2:4:6-trihalogen-1:3:5-triazine, especially cyanuric bromide or cyanuric chloride (2:4:6-trichloro-1:3:5-triazine) in the molecular ratio of at least 1:1, or they may be obtained from appropriate dyestuff components containing a dichlorotriazine radical. For making the monoazo-dyestuffs of the Formula 3 used as starting materials there may be used, for example, a diazo-compound of a 1-monoacylamino-4-aminobenzene-3-sulfonic acid or of a 1-monoacylamino-3-aminobenzene-4-sulfonic acid, of which the acyl radical is hydrolyzed to liberate the amino group, after coupling the diazo-compound with the 3-methyl-5-pyrazolone.

The condensation of the amino-azo-dyestuff obtained from these components and containing in the radical of the diazo-component an acylatable amino group, with cyanuric chloride is carried out in such manner that the condensation product obtained contains two exchangeable halogen atoms, of which one is exchanged in the process of this invention for the radical of an aminobenzene carboxylic acid.

As aminobenzene carboxylic acids there may be mentioned amino-salicylic acid, methoxy-, chloro-, nitro- or methylamino-benzoic acids, sulfo-anthranilic acids, aminophthalic acid, amino-isophthalic acid, para-aminobenzoic acid and advantageously ortho- or meta-aminobenzoic acid itself.

The condensation of the aminobenzene carboxylic acids with dihalogen-triazine dyestuffs is advantageously carried out with the use of an acid-binding agent, such as sodium carbonate or sodium hydroxide, and under conditions such that an exchangeable halogen atom remains in the finished product, that is to say, for example, by carrying out the condensation in an organic solvent or at a relatively low temperature in an aqueous medium.

In a modification of the above process the azo-dyestuffs of this invention can be made by using as an amino-monoazo-dyestuff used as starting material for making the dichloro-triazine dyestuffs, and condensing an amino-monoazo-dyestuff which contains an acylatable amino group in the radical of the diazo-component, for example, an amino-monoazo-dyestuff obtainable from the above mentioned components, with a 4:6-dihalogen-1:3:5-triazine which contains in the 2-position the radical of an amino-benzene sulfonic acid.

The dihalogen-triazines of the latter constitution can be made by methods in themselves known from cyanuric halides, for example, cyanuric bromide or cyanuric chloride, by reacting, for example, one molecular proportion of cyanuric chloride, with one molecular proportion of one of the aminobenzene carboxylic acids mentioned above. For making the monoazo-dyestuffs of this invention the dihalogen-triazine compounds so obtained may be condensed with the finished amino-monoazo-dyestuffs of the Formula 3 or advantageously with the 2:4- or 2:5-diaminobenzene-1-sulfonic acids used as diazo-components for making the aforesaid dyestuffs.

In making the dyestuffs of this invention by the condensation of one of the aforesaid amino-monoazo-dyestuffs with cyanuric chloride and one of the aforesaid aminobenzene carboxylic acids it is generally possible to carry out the condensations in either order of succession. When the dyestuffs are made by the method of coupling the necessary condensations for making the secondary condensation products to be used as diazo-components are advantageously carried out in such manner that the first condensation is with the aminobenzoic acid and the condensation with the diamino-benzene sulfonic acid is carried out subsequently.

The dyestuffs of this invention can be isolated and worked up into useful dry dyestuff preparations. The isolation of the dyestuffs is advantageously carried out at as low a temperature as possible by salting out, for example, in a strongly alkaline medium and especially in the presence of trisodium phosphate, followed by filtration. The dyestuffs obtained by filtering the medium in which they are prepared may be dried, if desired, after the addition of an extender. Advantageously the drying is carried out at not too high a temperature and under reduced pressure. By spray drying the mixture in which the dyestuff is produced it is in some cases possible to obtain a dry preparation directly, that is to say without first isolating the dyestuff. The dyestuffs of this invention are distinguished by their unexpectedly good solubility which is superior to the solubility of the corresponding known disulfo-dyestuffs.

The dyestuffs of this invention are suitable for dyeing or printing a very wide variety of materials, especially cellulosic materials of fibrous structure, such as linen, regenerated cellulose and especially cotton. These new dyestuffs yield full strong dyeings as the dyestuffs are very well absorbed by the fibers. This is especially true also in the case of deep tints. The new dyestuffs enable a complete scale from pale to deep yellow tints to be constructed. The dyestuffs are especially suitable for dyeing by the so-called pad dyeing process, in which the material is impregnated with an aqueous solution of the dyestuff, which may contain a salt, and the dyestuff is fixed on the fiber by treatment with an alkali by a heat treatment. This process and the direct dyeing method, which can also be used with many of the dyestuffs of this invention, leads, as do printing methods, to dyeings and prints which are generally distinguished by the purity and depth of their tints, their very good fastness to light and above all by their excellent fastness to washing.

The following examples illustrate the invention, the parts and percentages being by weight:

*Example 1*

A finely dispersed suspension of 18.6 parts of cyanuric chloride in 100 parts of water and 200 parts of ice is mixed at 0° C. with a neutral aqueous solution of 13.7 parts of 2-amino-benzene-1-carboxylic acid. The pH value of the reaction mixture is maintained at 6.5 to 7.0 by the dropwise addition of dilute sodium hydroxide solution. The whole is stirred for 1 hour at 0° C. A neutral solution of 18.8 parts of 1:4-diaminobenzene-3-sulfonic acid in 200 parts of water is then added, the mixture is heated to 40° C. and stirred at the same temperature for 2 hours. By adding dropwise dilute sodium hydroxide solution the pH value of the reaction mixture is kept constant between 6 and 7.

The dicondensate formed is cooled with 400 parts of ice to 0° C. 27 parts of hydrochloric acid of 30% strength are added dropwise and diazotization is performed with a solution of 6.9 parts of sodium nitrite in 300 parts of water. After 2 hours the diazotization is complete. The diazo compound is then coupled with 9.8 parts of 3-methyl-5-pyrazolone dissolved in 200 parts of water to which 13.5 parts of sodium hydroxide solution of 30% strength have been added; 20 parts of sodium carbonate are added, and the temperature is maintained at 0° C. by adding ice. The mixture is stirred for several hours and the dyestuff is precipitated with sodium chloride, filtered off and dried.

The new dyestuff dyes cellulose fibers by the dyeing methods described in Examples 3 and 4 reddish yellow tints which are fast to washing.

Very similar dyestuffs, which are likewise fast to washing, are obtained when there is used for the first condensation with cyanuric chloride 2-amino-4-sulfobenzene-1-carboxylic acid or 2-amino-5-sulfobenzene-1-carboxylic acid instead of 2-aminobenzene-1-carboxylic acid, proceeding otherwise in an identical manner.

*Example 2*

A suspension of 18.6 parts of cyanuric chloride in 200 parts of ice and 100 parts of water is treated at 0° C. with a neutral aqueous solution of 18.8 parts of 1:3-diaminobenzene-4-sulfonic acid. The pH value of the reaction mixture is advantageously maintained at about 6 by adding dilute sodium hydroxide solution. When the condensation is complete, 13.7 parts of 2-aminobenzene-1-carboxylic acid are added, and the temperature is maintained for 3 hours at 40° C., while keeping the pH value of the reaction mixture constant at 6 to 7 by the dropwise addition of dilute sodium hydroxide solution.

The dicondensate formed is cooled to 0° C. with 400 parts of ice. 27 parts of hydrochloric acid of 30% strength are added dropwise and diazotization is performed with a solution of 6.9 parts of sodium nitrite in 300 parts of water. After 2 hours the diazotization is complete. The diazo compound is coupled with 9.8 parts of 3-methyl-5- pyrazolone dissolved in 200 parts of water to which 13.5 parts of sodium hydroxide solution of 30% strength have been added; 20 parts of sodium carbonate are added, and the temperature is maintained at 0° C. by adding ice. After a few hours the dyestuff is precipitated, filtered off and dried; it dyes cellulose fibers by the methods described in Examples 3 and 4 greenish yellow tints which possess good properties of fastness to washing and light.

Similar dyestuffs yielding greenish yellow dyeings are obtained when 2-aminobenzene-1-carboxylic acid is replaced by the following aminocarboxylic acids:

3-aminobenzene-1-carboxylic acid,
4-aminobenzene-1-carboxylic acid,
2-amino-4-ethoxybenzene-1-carboxylic acid,
2-amino-5-acetaminobenzoic acid,
4-amino-2-hydroxybenzoic acid,
2-aminobenzoic acid-4- or -5-sulfonic acid,
5-chloro-2-aminobenzoic acid,
Aminophthalic acid or
Aminoisophthalic acid.

When an aminobenzoic acid substituted by a nitro group is used, the resulting dyestuffs produce slightly more reddish yellow tints.

Dyestuffs having similar properties are also obtained when instead of the 18.6 parts of cyanuric chloride specified above a corresponding amount of cyanuric bromide is used.

*Example 3*

2 parts of the dyestuff of the formula

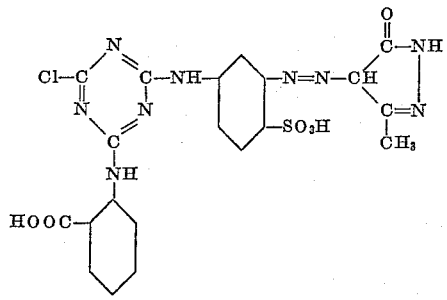

are dissolved in 400 parts of water together with 80 parts of trisodium phosphate, and the whole is made up to 4000 parts. 80 parts of sodium chloride are added and 100 parts of a cotton fabric are immersed in the dyebath thus prepared. The temperature is then raised to 60° C. within ½ hour, another 80 parts of sodium chloride are added, the temperature is raised to 80° C. within ¼ hour, and the whole is maintained at the same temperature for ½ hour. The greenish yellow dyeing thus produced is then rinsed and soaped for 15 minutes in a boiling 0.3% solution of a non-ionic detergent; the dyeing has excellent properties of fastness.

When the dyestuff mentioned above is replaced by 2 parts of the dyestuff of the formula

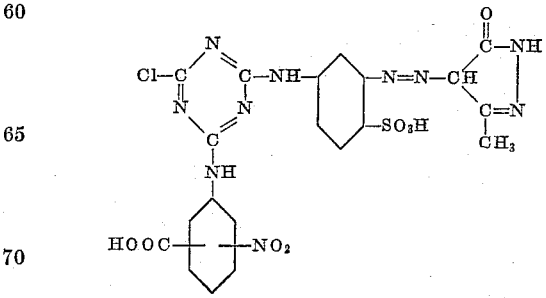

proceeding otherwise in an identical manner, a reddish yellow dyeing is obtained which is fast to washing and light.

Example 4

1 part of the dyestuff of the formula

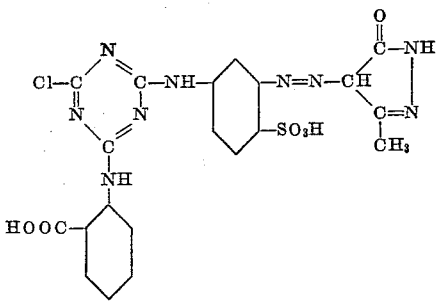

is mixed with 9 parts of urea and dissolved in 100 parts of water.

A cotton fabric is impregnated with this solution at 80° C. on a padder, and the surplus liquor is squeezed off until the weight of the fabric shows an increase of 75%.

The fabric thus impregnated is dried and then impregnated at room temperature with a solution containing per liter 10 grams of sodium hydroxide and 300 grams of sodium chloride, squeezed to a weight increase of 75%, steamed for 60 seconds at 100 to 101° C., rinsed, treated in a sodium bicarbonate solution of 0.5%, rinsed, soaped for 15 minutes in a boiling 0.3% solution of a non-ionic detergent, rinsed and dried.

A greenish yellow dyeing is obtained which is fixed fast to boiling.

When a fabric of staple fibers of regenerated cellulose is treated as described above for the cotton fabric, a similarly good result is obtained.

When the dyeing operation is carried out with the dyestuff solution at 30° C., instead of at 80° C. as described, a similarly good result is obtained.

Yellow dyeings of pale to deep tints can be produced with the new dyestuffs of this invention.

Example 5

2 parts of the dyestuff of the formula

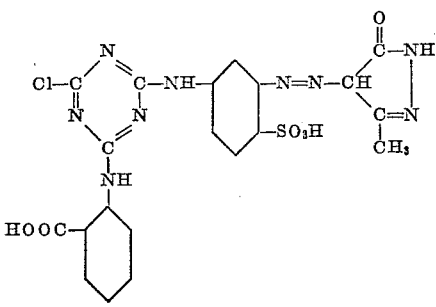

are boiled in 28 parts of water and 20 parts of urea are added.

This dyestuff solution is stirred into 50 parts of the thickening agent described below:

50 parts of sodium alginate are strewn into 880 parts of water. 10 parts of sodium hexametaphosphate, 20 parts of sodium meta-nitrobenzenesulfonate and 40 parts of sodium carbonate are then stirred in, and the solution is kept for several hours. The dyestuff solution is then added as described above.

A cotton fabric is printed with the resulting printing paste on a roller printing machine. The print is dried, steamed for 8 minutes, rinsed in cold water and then in warm water, soaped for 15 minutes in a boiling soap solution of 0.1% strength, rinsed and dried.

A yellow print is obtained which is fixed fast to boiling.

When a fabric of staple fibers of regenerated cellulose is treated as described above for the cotton fabric, a similarly good result is achieved.

Example 6

A solution of 2 parts of the dyestuff of the formula

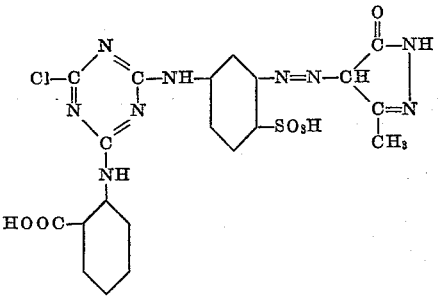

in 50 parts of water is stirred into 1175 parts of a viscose xanthate solution of 8.5% strength, corresponding to a content of 100 parts of α-cellulose.

The mixture is stirred for ½ hour and then kept for 24 hours at room temperature.

In the manner usually applied to the spinning of viscose yarn viscose mass is then squeezed through spinnerets and coagulated at 45° C. in a precipitation bath containing per liter 120 grams of sulfuric acid of 96% strength, 270 grams of sodium sulfate as well as 10 grams of zinc sulfate.

The filaments produced in this manner are stretched by 25% and collected in a spinning can rotating at 6000 revolutions per minute.

The cake obtained in this manner is then after-treated in a closed apparatus through which liquor circulates. First the cake is rinsed for 10 minutes in water heated at 60 to 70° C., desulfurized for 20 minutes at 70° C., rinsed in a solution containing per liter 5 grams of sodium sulfite, and finally scrooped with 50 grams of sodium oleate per liter for 10 minutes at 50° C.

The water is then removed from the cake which is finally dried.

The cake has a transparent yellow tint and is fast to washing.

Example 7

The yellow aminomonoazo dyestuff of the formula

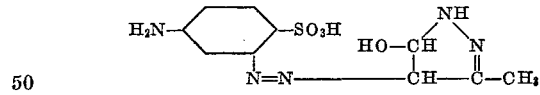

is prepared in the known manner by diazotizing 23.0 parts of 1-amino-3-acetaminobenzene-6-sulfonic acid, coupling the diazo compound with 9.8 parts of 3-methyl-5-pyrazolone and then hydrolyzing the acetamino group in dilute sulfuric acid.

29.7 parts of the aminomonoazo dyestuff prepared in this manner are dissolved in the form of the sodium salt in 300 parts of water, and the solution is added to a fine suspension of 18.6 parts of cyanuric chloride in 200 parts of water which further contains 100 parts of ice. The mixture is thoroughly stirred at 0 to 5° C. and by the gradual addition of dilute sodium hydroxide solution the pH value is kept constant between 6.0 and 6.5. Stirring for 2 hours completes the condensation. A solution of 13.8 parts of 2-aminobenzoic acid, in the form of the neutral sodium salt dissolved in 100 parts of warm water, is then added. The reaction temperature is adjusted to 45° C., and the whole is kept at this temperature for 4 hours with thorough stirring. By the intermittent addition of dilute sodium hydroxide solution the pH value of the reaction mixture is maintained between 6.5 and 7.0. The dyestuff is then salted out with sodium chloride and filtered off; it is identical with the dyestuff obtained as described in Example 2.

What is claimed is:

1. Water-soluble monoazo-dyestuffs of the formula

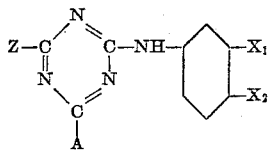

in which A represents the radical of an amino-benzene carboxylic acid bound through its amino group to the carbon atom of the triazine nucleus, Z represents a member selected from the group consisting of a chlorine atom and a bromine atom, and one of the symbols X represents a sulfonic acid group and the other X represents a grouping of the formula

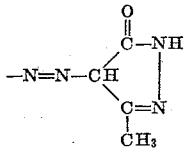

2. A water-soluble monoazo-dyestuff of the formula

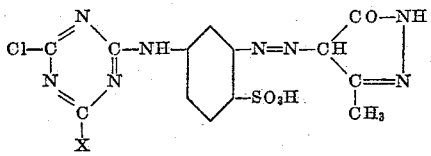

wherein X represents the radical of an amino-benzene carboxylic acid bound to the carbon atom of the triazine nucleus by its amino group.

3. A water-soluble monoazo-dyestuff of the formula

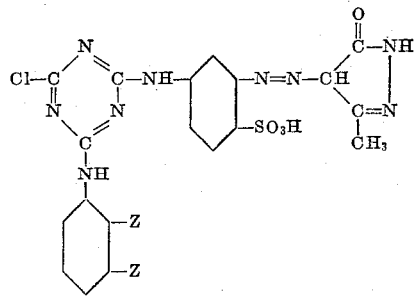

in which one Z represents a hydrogen atom and the other Z a carboxylic acid group.

References Cited in the file of this patent
UNITED STATES PATENTS 2,722,527    Wehrli et al. _____ Nov. 1, 1955
2,795,576    Fasciati _____ June 11, 1957